UNITED STATES PATENT OFFICE.

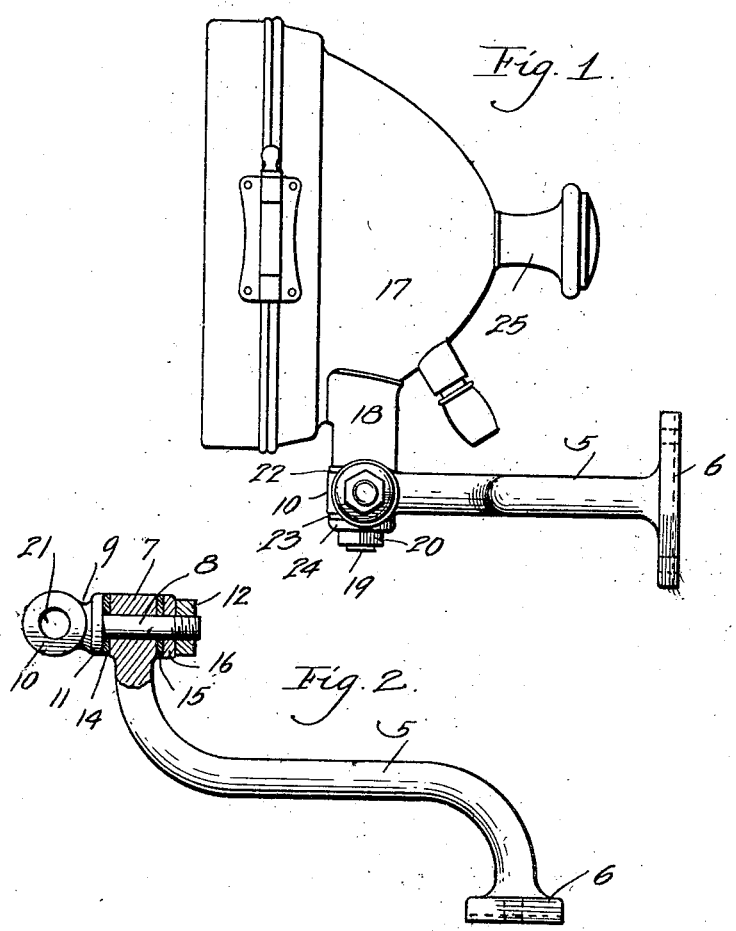

JAMES R. SHIRREFFS, OF LOS ANGELES, CALIFORNIA.

UNIVERSAL JOINT.

1,101,817.  Specification of Letters Patent.  Patented June 30, 1914.

Application filed May 22, 1913. Serial No. 769,286.

*To all whom it may concern:*

Be it known that I, JAMES R. SHIRREFFS, a citizen of the United States, residing at Los Angeles, in the county of Los Angeles and State of California, have invented new and useful Improvements in Universal Joints, of which the following is a specification.

This invention relates to universal bearings, and more particularly to bearings adapted for supporting bracket lamps upon a vehicle, and the principal object is to provide a strong and efficient joint with suitable friction disks so that the lamp supported on the bracket will have universal movement and be readily retained in any desired position to which it may be shifted.

In the drawings accompanying this specification and forming therewith the application for Letters Patent: Figure 1 is a side elevation of a bracket showing the joint applied thereto connected with an electric automobile lamp. Fig. 2 is a plan view of the bracket, the joint end being shown in section, the lamp and its pivoted stud being removed.

More specifically in the drawings, 5 designates an angle bracket having a base plate 6 which is provided with suitable bores so that the same may be secured to the body of the vehicle or other object on which it is desired to secure the bracket, the outer end being provided with a bore in the head 7, the bore being preferably in a plane parallel with the plane to which the plate 6 is secured and of such size as to readily receive the cylindrical stud 8 formed on the swiveling member 9. This member also has a head 10 in which a bore is provided in a plane at right angles to the axial plane of the cylindrical stud 8 and interposed between these two is a bearing flange 11. The upwardly disposed end of the stud 8 is threaded and adapted to engage a nut 12.

In assembling the device a fiber washer 14 is preferably placed adjacent the bearing flange 11 and adapted to engage the flat face of one side of the head 7. A similar fiber washer or other suitable friction material 15 is interposed between the metal washer 16 which is placed in position before the nut 12 is secured on the stud.

This fixture is particularly adapted for supporting electric headlights of the type 17 shown, which is provided with a supporting extension 18 having a flat face projecting frame which has a cylindrical stud threaded on its free end to receive a nut 20. This stud 19 is of such size that it fits within the bore 21 in the head 10, and interposed between the face of the extension 18 in the head is a fiber washer 22, a similar washer 23 being placed adjacent the metal washer 24 to form a suitable bearing surface for this washer and the nut 20.

In the operation of the device, by means of a suitable handle shown at 25 the lamp 17 may be turned readily in a universal direction and will remain in this position without adjustment and without being affected by the vibrations of the vehicle to which it is applied when the latter is moving.

What I claim is:

A universal swiveling joint, comprising a bracket member having an apertured head formed with flat parallel side faces, a swiveling member having an apertured head, an annular bearing flange, and a cylindrical stud adapted to engage said aperture in said bracket head, friction disks engaging the side faces of said head and encircling said stud, means to secure said stud in frictional engagement, a supporting member having a flange, a centrally disposed cylindrical stud adapted to bear within the aperture in said swiveling member, frictional plates to engage said head of the swiveling member, and securing means to secure said supporting member in pivotal relation to said swiveling member.

In witness that I claim the foregoing I have hereunto subscribed my name this 14th day of May, 1913.

JAMES R. SHIRREFFS.

Witnesses:
IRIE WELCH,
MARIE BATTEY.